United States Patent [19]

Wolf et al.

[11] Patent Number: 5,157,909
[45] Date of Patent: Oct. 27, 1992

[54] RING SPINNING OR TWISTING FRAME WITH SUCTION INSTALLATION

[75] Inventors: Horst Wolf, Bülach; André Lattion, Seuzach, both of Switzerland

[73] Assignee: Maschinenfabrik Rieter AG, Winterthur, Switzerland

[21] Appl. No.: 747,183

[22] Filed: Aug. 19, 1991

[30] Foreign Application Priority Data

Aug. 21, 1990 [CH] Switzerland ............... 02702/90

[51] Int. Cl.⁵ .............. D01H 5/66; D01H 3/16
[52] U.S. Cl. ............................ 57/304; 57/305; 57/308; 15/312.1
[58] Field of Search ............... 57/304–305, 57/308; 15/301, 312.1

[56] References Cited

U.S. PATENT DOCUMENTS

| 3,412,545 | 11/1968 | Lippuner . |
| 4,129,979 | 12/1978 | Hamel ............... 57/304 X |
| 4,679,389 | 7/1987 | Wolf ................. 57/308 X |
| 4,803,834 | 2/1989 | Vogel et al. ........... 57/308 |

FOREIGN PATENT DOCUMENTS

| 2244668 | 3/1974 | Fed. Rep. of Germany . |
| 2419188 | 11/1975 | Fed. Rep. of Germany . |
| 3010011 | 9/1981 | Fed. Rep. of Germany ... 57/304 |
| 3642038 | 6/1988 | Fed. Rep. of Germany . |
| 2232628 | 3/1975 | France . |
| 62-62936 | 3/1987 | Japan . |
| 345288 | 4/1960 | Switzerland ............... 57/304 |
| 383233 | 12/1964 | Switzerland ............... 57/304 |
| 982604 | 2/1965 | United Kingdom . |
| 1235189 | 6/1971 | United Kingdom .......... 57/304 |

Primary Examiner—Daniel P. Stodola
Assistant Examiner—William Stryjewski
Attorney, Agent, or Firm—Dority & Manning

[57] ABSTRACT

A suction and cooling system for a spinning frame having a plurality of spinning units arranged along a frame. The suction and cooling system includes a first collecting channel and an independent second collecting channel and exhaust means coupled to the first collecting channel and exhaust means coupled to the second collecting channel. The first exhaust means draw a first air stream into the first collecting channel from primarily the area around the drafting system of the spinning units. The first air stream comprises primarily reusable fibers and a filter may be provided for filtering out the reusable fibers. The second exhaust means draws an independent second air stream from primarily the area around the thread guiding device of the spinning units and from around the spindle drive means, thereby serving the dual function of collecting waste fly and cooling the spindle drive means. A second filter device may be provided in the second collecting channel for removing generally waste fiber fly material.

11 Claims, 2 Drawing Sheets

RING SPINNING OR TWISTING FRAME WITH SUCTION INSTALLATION

BACKGROUND OF THE INVENTION

The present invention relates to a ring spinning or twisting frame. Such frames are continuously undergoing development; attempting to increase the rotational speed of the spindle shafts or reducing the maintenance needs so as to increase the productivity of the machine which means a reduction of cost per unit of the goods produced.

GB PS 982.604 shows a suction installation on a machine of the above mentioned type which is effective on each of the encased thread guiding devices and which in particular removes dust, fibre fly and thread waste remaining within the spinning zone for example during doffing. This enables a trouble free operation and the necessary maintenance needs are reduced.

Furthermore, spinning or twisting frames are known where the suction installation is also effective on the drafting system and thus also removes the fibres accumulating there. The exhaust carrying off the waste particles flows within a wide area section through a circulating filter tape, which is regularly cleaned at certain predetermined locations. This filtering method assures that the exhaust emitted by the machine stays clean. As a result, there is no deposition on the machine, which supports trouble-free operation and also helps to reduce the required maintenance needs.

However, with the known art mentioned, production costs can be reduced only insufficiently. Further cost factors, such as for example the disposal of spinning or twisting waste (dust, fibre material, thread pieces etc.) and the waste heat developing during machine operation, rise with the increased production speed and thus diminishes the advantages achieved.

SUMMARY OF THE INVENTION

By doubling the collecting channels the fibers coming from the drafting system are lead to a filter which remains free of other waste such as fiber particles or thread waste accumulating during doffing. Accordingly the fibers can be removed from the filter and be reused, which reduces material consumption and thus increases productivity.

By cooling, the heat developed at the spinning drive is absorbed at its source and altogether transported to the periphery of the machine. With this an exhaust flow is provided at the periphery, which can be lead directly into the air conditioning system of the spinning mill hall, with the result that the air temperature in the spinning mill hall hardly rises. By this means it is not anymore necessary, that all the air in the spinning mill halls has to be recirculated and cooled until its temperature has risen by only a few degrees. The air conditioning installation now has to process a comparatively low volume air flow with a considerably increased temperature, which allows a smaller sized installation ion general. Furthermore the heat exchangers can also be of smaller size because of the resulting better heat transfer, resulting from the higher difference in temperature. An air conditioning installation which has to eliminate somewhat more than 30 kw per spinning frame and accordingly in spinning mill halls with a few dozen of machines, the amount of heat to be drawn off is substantial, a considerable technical simplification of the installation and a corresponding reduction of the cost of investment and operation can be reached, which in turn considerably reduces the cost per unit of the goods produced.

Other preferred forms of embodiments of the invention are set forth with the depending claims.

The invention will be described in greater detail hereafter with reference to the drawings.

DETAILED DESCRIPTION OF THE PREFERRED EMBODIMENT

Figure 1:
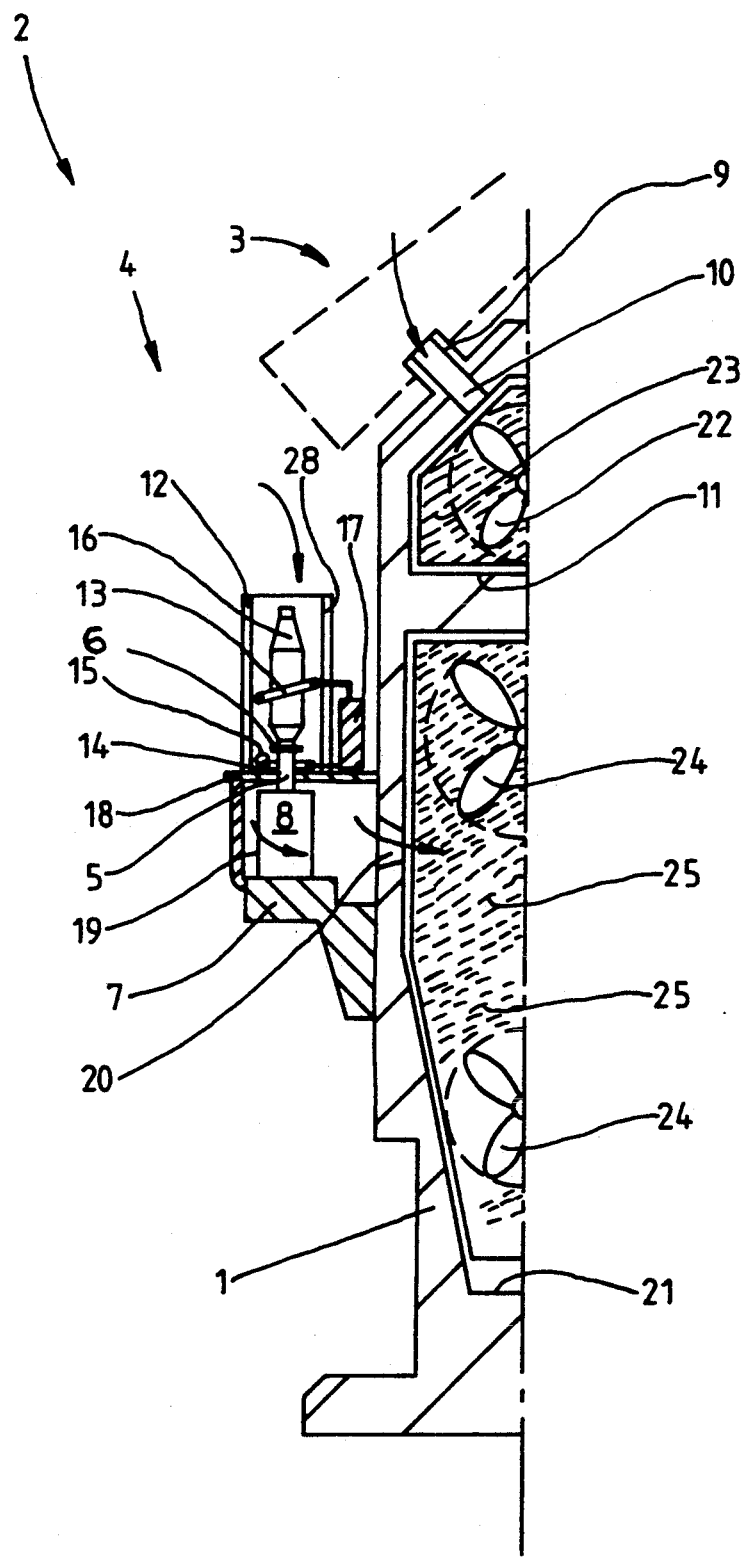
FIGS. 1 shows schematically a cross section of a ring spinning or twisting frame with the cooling tubes according to the invention.

FIG. 1 shows one half of the symmetrical cross section of a ring spinning or twisting frame; for simplification the other half of the machine is omitted.

Shown is a machine frame 1 with a spinning unit 2, which consists of a drafting system 3 indicated by its outline, and a thread guiding device 4. Shown is also a spindle shaft 5 with an underwinding barrier 6 and a spindle shaft drive 8 placed on a support 7.

An air suction tube 9 and a protruding pipe 10, connect the drafting system 3 with a first collecting channel 11 which runs lengthwise through the spinning or twisting frame.

The thread guiding device 4 is enclosed by a casing 12. In the casing 12 is a balloon control ring 13, a spinning ring 14, a traveller 15 running on said spinning ring and a cop 16 which is mounted onto spindle shaft 5. Spinning ring 14 and balloon control ring 13 are connected with a ring rail 17 running along the machine.

The casing 12 is separated from the spindle shaft drive 8 by a base plate 18. An opening in base plate 18 not shown in the figure, however, connects thread guiding device 4 with space underneath, designed as a cooling air channel 19 in which the spindle shaft motor 8 is located. Cooling air channel 19 discharges into a second collecting channel 21 through opening 20.

At the end of the collecting channel 11 which leads through the ring spinning or twisting frame is a suction blower 22. In front of the suction blower is a filter 23, which is equipped with a device to remove fly consisting of fibres. At the end of collecting channel 21 is also a suction blower 24 with a filter 25 equipped with a device for the removal of fly consisting of dust, fibre particles and thread waste.

When starting to operate the spinning or twisting frame, suction blowers 22, 24 are activated simultaneously. As a result, on one hand surrounding air is drawn in by suction through the vicinity of drafting system 3 and on the other hand through casing 12. Fibres accumulating during the operation of the drafting system are transported into collecting channel 11 and the same way dust and fibre particles accumulating during the operation of thread guiding device 4 and thread waste accumulating during doffing are transported into collecting channel 21. Accordingly, fibres are deposited in filter 23 and the remainder from thread guiding devices 4 is collected in filter 25.

While the remainders from filter 25 have to be disposed of as waste, the fibres collected in filter 23 can be reused, i.e. processed for a further spinning process. As a result, waste from the spinning and twisting process is reduced, which relieves the infrastructure linked with the system and which improves utilization of the raw material and thus increases the productivity of the spinning and twisting frames.

Figure 2:
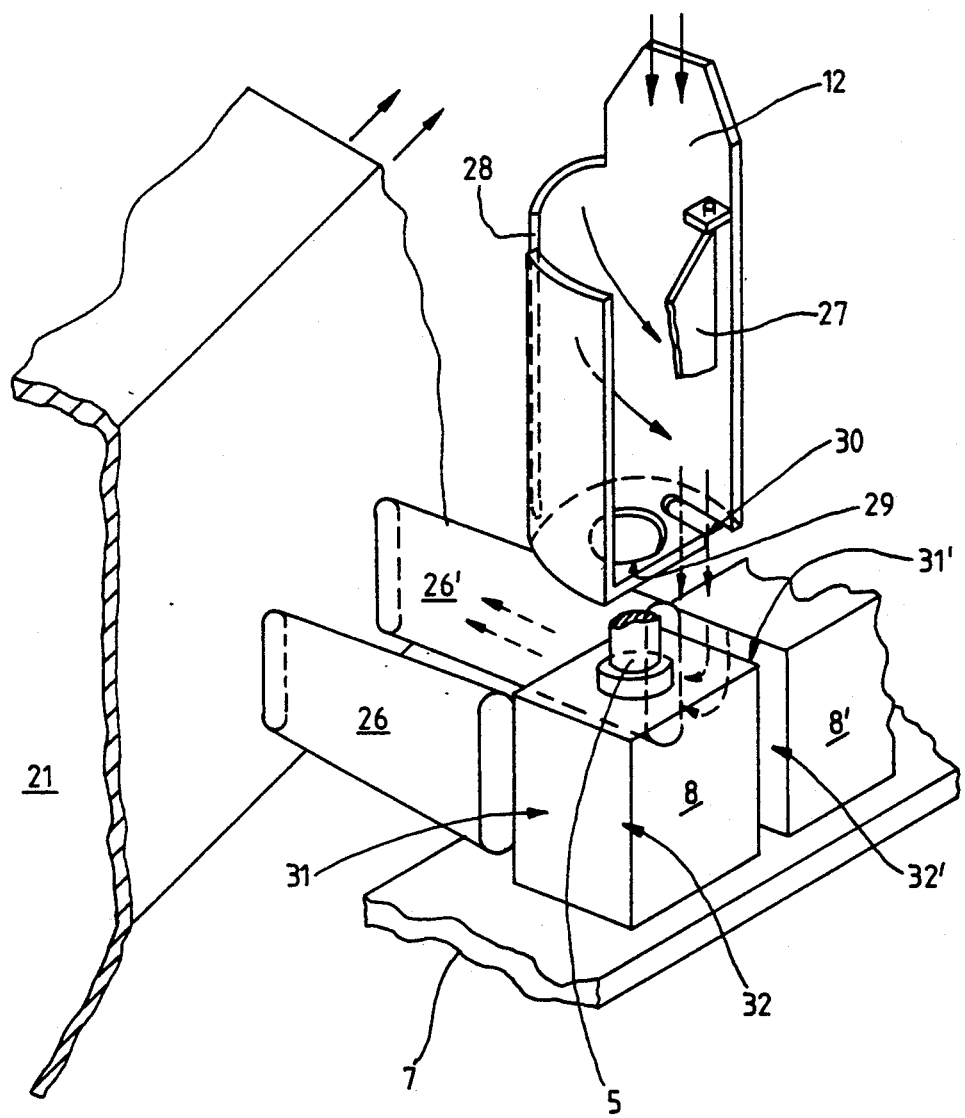
FIG. 2 shows schematically a view of the course of the cooling channels within the surrounding area of the spindle shaft drives.

FIG. 2 shows a view of a preferred arrangement of the air passages from casing 12 up to collecting channel 21. For simplification, some casing parts and the thread guiding device 4 are not shown in the figure.

The figure shows a casing 12, spindle shaft drives 8, 8' placed on support 7 and cooling air channels 26, 26' leading into collecting channel 21.

Casing 12 is of cylindrical shape and kept open at the top for automatic doffing. On the front side is a door 27 which allows access to thread guiding device 4. At the rear side is an opening, made as slot 28, to provide for a connection of the ring rail 17 with spinning ring 14 and balloon control ring 13. Base plate 29 as part of casing 12 formed in one piece is provided with an opening 30.

Spindle shaft drives 8, 8' have a rectangular shaped casing mounted in spaced arrangement from each other on support 7; this way gaps 31, 31' are formed being limited at the top by the respective opening 30 in base plate 29 of casing 12 and at the rear by the cooling air channel 26, 26'. Thus, the side walls of the spindle shaft drives 8, 8' form sections of the cooling air passage between casing 12 and collecting channel 21.

During operation of suction blower 25, air is drawn from the casing 12 into the channel 21 as indicated by arrows in the figure, thereby drawing off dust, fibre particles and thread waste. At the same time the air stream passing the spindle shaft drives 8, 8' draws off their waste heat, thereby raising the temperature of air entering collecting channel 21 by about 10 to 25 degrees above the temperature of the air surrounding the machine.

The air of higher temperature is transferred to the air conditioning system of the spinning mill through a cooling air connection not shown in the figures. Thereby, the air temperature in the spinning mill hall rises considerably slower, with the advantage that this air does not need to be circulated approximately 30 times per hour but only approximately 10 times per hour, in order to maintain an agreeable working climate for the attending personnel. Furthermore, the exhaust flow of the cooling air, carrying off the waste heat to the air conditioning system is of comparatively small quantity, however heated by 10° to 25° C. Under these conditions the technical requirements for the air conditioning system are substantially reduced, resulting in lower investment and operating costs for the spinning and twisting processes.

Preferably the front sides between gaps 31, 31' are not covered in order to leave openings 32, 32' for the suction of additional air. As a result, part of the cooling air stream containing fly, passes the spindle shaft drives coming from the upper side opening 30, while a further part of the cooling air stream containing fresh air is drawn through openings 32, 32', which in relation of the direction of the air flow are located in front of the spindle shaft drives. Thus only the air needed to draw off the accumulating waste has to be lead through casing 12 which has a higher resistance to flow because of the cop, allowing the suction blower 25 to operate at its lowest possible capacity. In a further embodiment not shown, casings are provided to cover the front sides of the spindle shaft drives, said casings having air inlet openings corresponding with openings 32, 32', thus also allowing to blend in fresh cooling air.

Furthermore, collecting channel 21 is preferably dimensioned for a capacity of approximately 10,000 m3 and the collecting channel 11 for about half of this capacity. This results in an optimal configuration of the space available for collecting channels inside frame 1.

In a further embodiment, the cooling air passages are lead through the spindle shaft drives.

What is claimed is:

1. A suction and cooling system for a spinning frame having spinning units arranged along a frame, each spinning unit including a drafting system, a thread guiding device, a spindle shaft, and drive means for driving the spindle shaft, said suction and cooling system for removing fibre, fibre fly, and waste threads from said spinning units and for cooling said drive means, said system comprising:

a first collecting channel;

at least one suction tube extending generally from said drafting system of each said spinning unit and opening into said first collecting channel;

first exhaust means coupled to said first collecting channel for drawing a first air stream into said first collecting channel, said first air stream being drawing primarily from the area of said drafting system and comprising primarily reusable fibres;

a second collecting channel, said second collecting channel being independent from said first collecting channel so that respective air streams within said first and second collecting channel do not admix;

a casing enclosing each of said spindle shafts, said casing comprising an exhaust opening therethrough, said exhaust opening defining a flow path for air through said casing to the area of said spindle drive means; at least one suction tube extending from the area around said guiding device through said casing and said exhaust opening and from around said spindle drive means of each spinning unit and opening into said second collecting channel; and second exhaust means coupled to said second collecting channel for drawing a second air stream independent of said first air stream into said second collecting channel, said second air stream being drawing primarily from the area around said thread guiding device through said casing and said exhaust opening and from around said spindle drive means, said second air stream thereby collecting fly from the thread guiding device area and cooling said drive means.

2. The system according to claim 1, further comprising:

a filter device disposed within said first collecting channel for removing primarily reusable fibres from said first air stream.

3. The system according to claim 1, further comprising:

a filter device disposed within said second collecting channel to remove fly, consisting of fibre particles and waste thread from said second air stream.

4. The system as set forth in claim 1, whereby:

said first collecting channel is positioned above and parallel to said second collecting channel and extends lengthwise through said spinning frame.

5. The system as set forth in claim 1, further comprising:

said second collecting channel having approximately double the exhaust capacity as said first collecting channel.

6. The system as set forth in claim 1, further comprising:
said cashing having a base plate with side walls, at least one said exhaust opening provided in said base plate.

7. The system as set forth in claim 1, further comprising:
a cooling air channel extending from adjacent said spindle drive means and opening into said second collecting channel.

8. The system as set forth in claim 1, further comprising:
a support for supporting said spinning ring, and a slot in a side wall of said casing being of sufficient size to allow said support for said spinning ring to extend therethrough.

9. A system as set forth in claim 1, further comprising:
an opening provided in said second collecting channel to admix fresh air.

10. A system as set forth in claim 1, further comprising:
an air conditioning system, said air conditioning system being in fluid communication with at least said second collecting channel.

11. A system as set forth in claim 1, further comprising:
a first filter device disposed within said first collecting channel for removing primarily reusable fibres from said first air stream, and a second filter device disposed within said second collecting channel to remove fly consisting of primarily fibre particles and waste thread from said second air stream.

* * * * *